March 13, 1956  G. B. BENANDER  2,738,482
SURFACE WIRING DEVICES
Filed Nov. 25, 1953  3 Sheets-Sheet 2
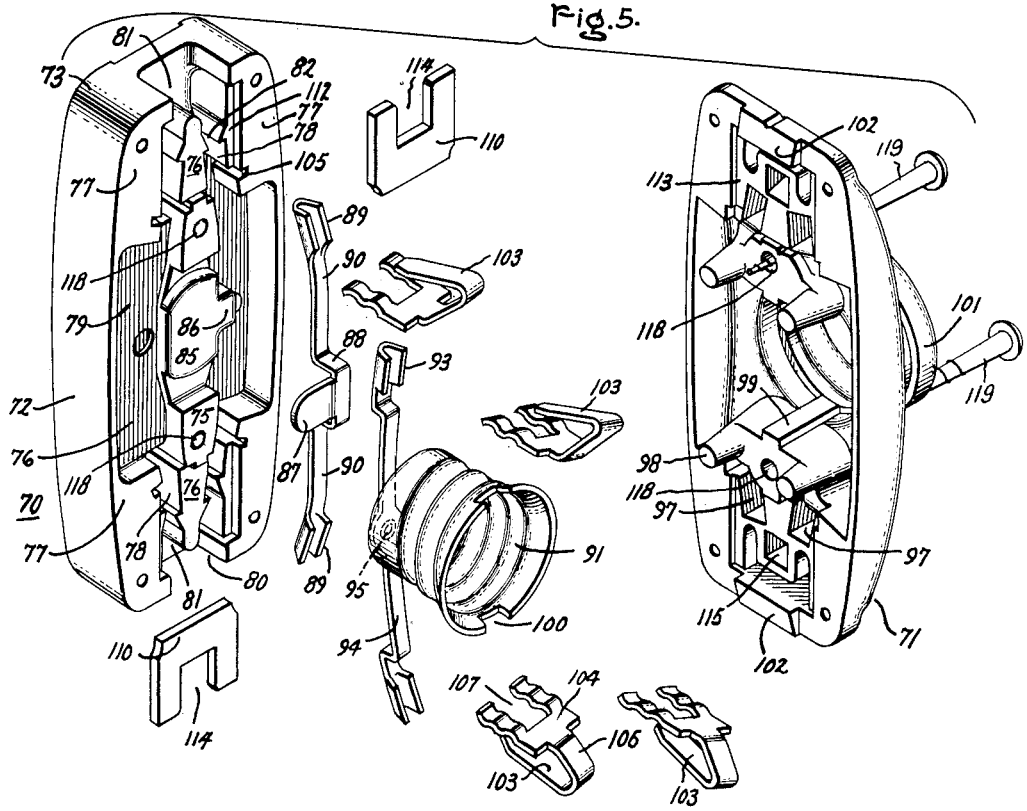
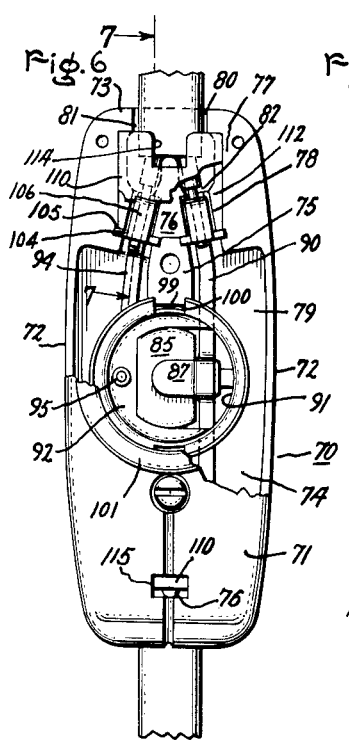
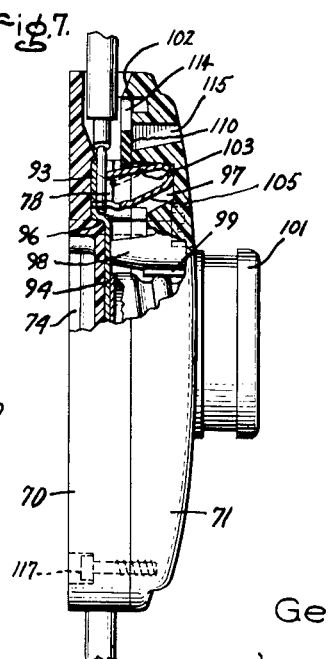
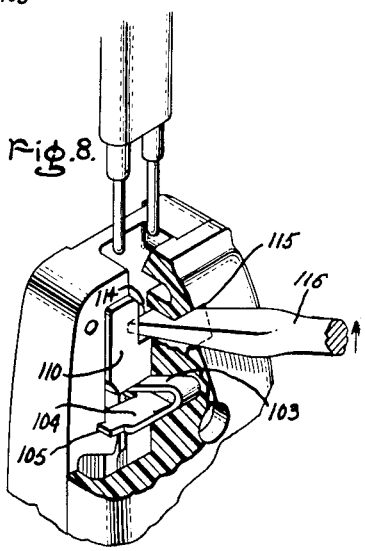
Inventor:
George B. Benander,
by Otto R... 
His Attorney.

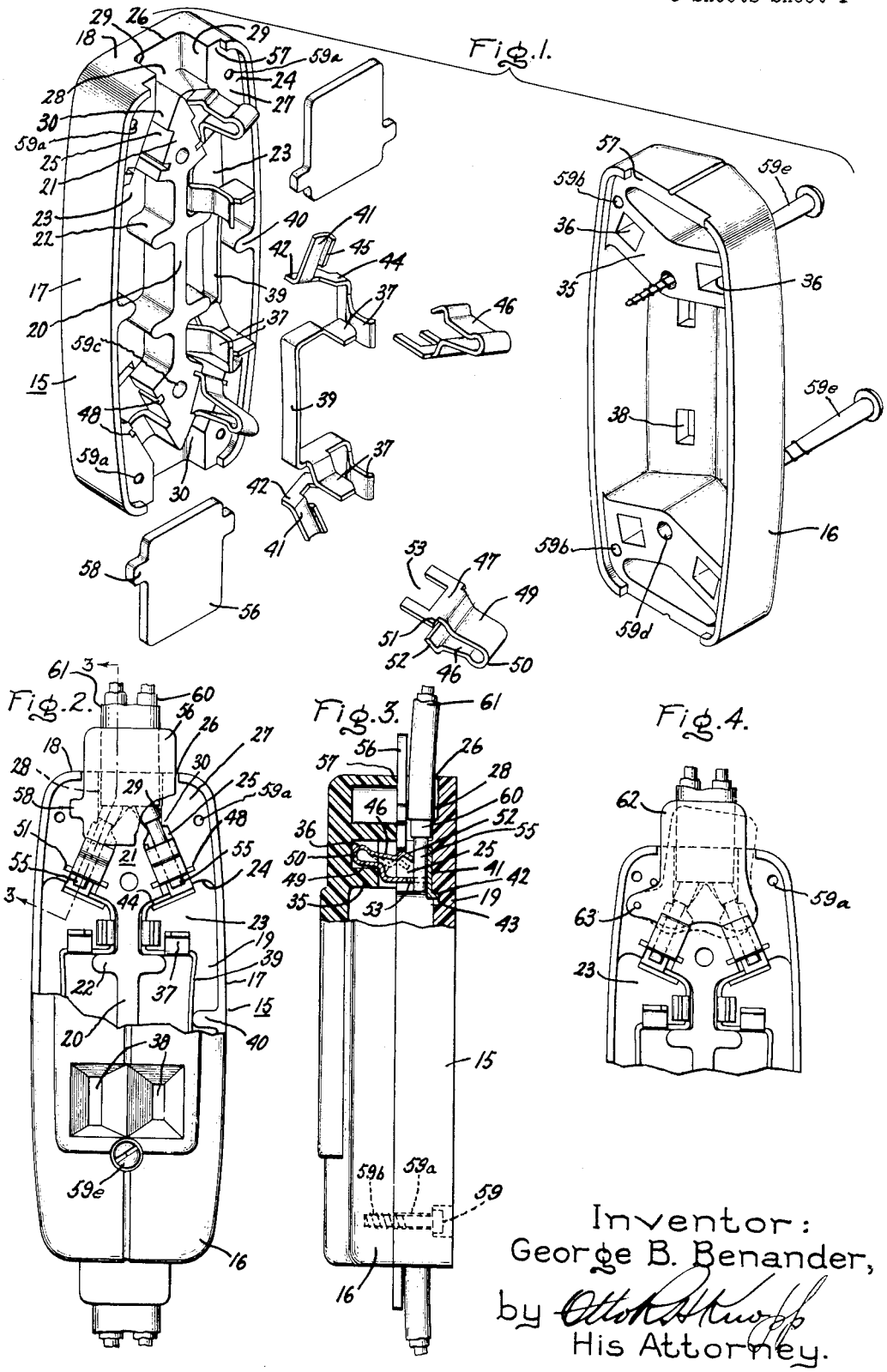

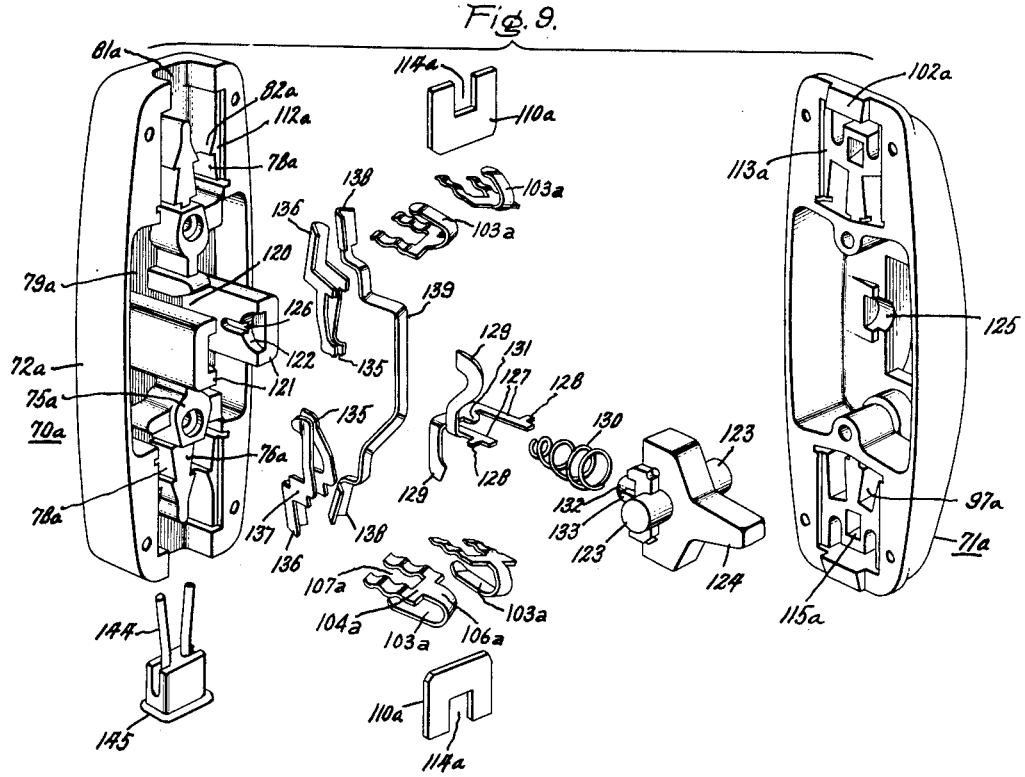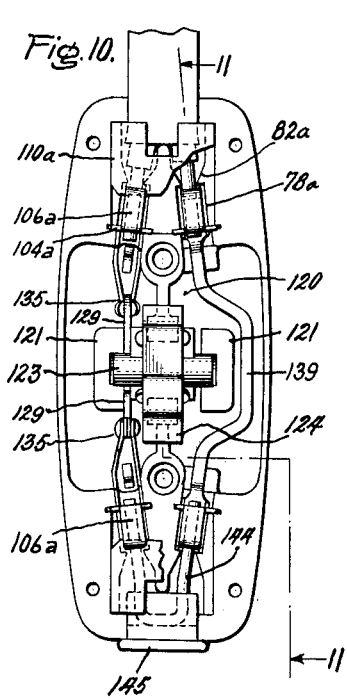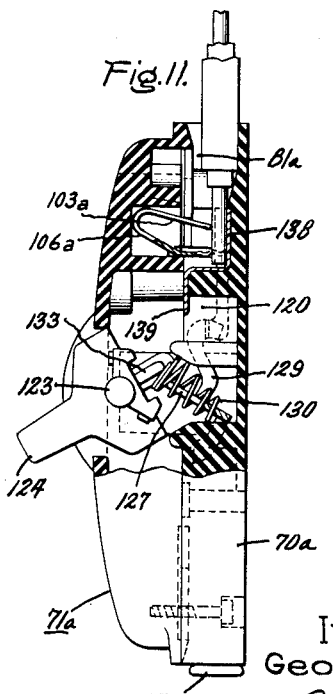

United States Patent Office 2,738,482
Patented Mar. 13, 1956

2,738,482

SURFACE WIRING DEVICES

George B. Benander, Oaklawn, R. I., assignor to General Electric Company, a corporation of New York Application November 25, 1953, Serial No. 394,425

14 Claims. (Cl. 339—164)

The present invention relates to surface wiring devices, i. e., wiring devices such as duplex plug receptacles, switches, lampholders, junction boxes, and the like which are fastened directly on an outer surface and which are connected to the power circuit by insulated conductors running along the wall surface and suitably attached thereto, the insulated conductors being ordinarily in the form of a cable known as non-metallic sheathed cable.

In my application Serial No. 321,149, filed November 18, 1952, assigned to the same assignee as is the instant application, now Patent No. 2,705,785, I disclose and claim a form of locking tongue structure for wiring devices whereby a wire end may be connected to a wiring device by merely inserting it into a wire-receiving opening in the receptacle body, the wire end being held by the locking tongue which serves to replace the terminal screw. In such application my invention is disclosed as being embodied in wiring devices of the type which in use are mounted in wall outlet boxes.

My present invention has to do with improved constructions and arrangements whereby a locking tongue of the type disclosed in my above-referenced application, preferably the locking tongue of such application, is embodied in surface wiring devices.

My present invention has marked utility from the standpoint of the user in that, since terminal screws are dispensed with, the two parts of a surface wiring device housing, the base and the cover, can be permanently connected together, it being no longer necessary to separate the two parts as heretofore to give access to binding screws. This effects substantial savings in time for the user and greatly simplifies the making of the wiring connections.

According to one feature of the invention, the housing of surface wiring devices, which housing comprises a base and a cover, is provided adjacent to each end with walls which define terminal cavities which extend vertically with respect to the bottom wall of the base from such bottom wall to the top wall of the cover. On the bottom walls of the cavities are terminals connected with contacts in the housing. In the two ends of the housing outwardly of said cavities are wiring chambers of a size to receive the end of standard non-metallic sheathed cable such as is used for house wiring. Connecting the wiring chambers to the adjacent cavities are wire end-receiving openings of a size to permit the passage through them of the largest size wire with which the wiring device is intended to be used. In the cavities are locking tongue structures which extend vertically with respect to the base and which are adapted to clamp wire ends against the terminals in the cavities. Preferably the portions of the walls between the cavities which are in line with the wiring chambers are spear-shaped, the heads of the spears projecting somewhat into the chambers to provide diverging passages which serve to effect a widened separation of wire ends positioned in the terminal cavities, the ends of the heads serving also as stops to limit insertion of a cable end into the housing.

According to another feature of the invention, plates are positioned between the base and cover adjacent to the locking tongues which are adapted to be forced against locking tongues to effect movement of the tongues to release wire ends held by the tongues, a now preferred arrangement being one wherein openings are provided in the top wall of the cover through which a tool end may be inserted into engagement with a plate for moving it.

According to another feature of the invention when embodied in a switch, the terminals in two cavities are connected to the switch contacts and the terminals in the other two cavities are connected to each other, the terminals connected to switch contacts being adapted to be connected in the "hot" or live wire of a circuit, the other terminals serving to carry the neutral or ground wire of the circuit through the switch. And as a further feature of my invention when embodied in a switch, I provide a short circuiting plug for connecting together the terminals at one end of the switch housing, whereby the switch may be used at the end of a circuit, i. e., in a circuit where the load is in one line between the energy source and the switch. Usually, in use, the switch is located between the source and the load, in which case the short circuiting plug is not needed since the cable from the power source is connected to one end of the switch and the cable leading to the load is connected to the other end of the switch.

For a consideration of what I believe to be novel and my invention, attention is directed to the following specification and to the claims appended thereto.

In the drawings:

Fig. 1 is an exploded perspective view of a duplex plug receptacle embodying the invention.

Fig. 2 is a top plan view with the housing partly broken away to show inside structure.

Fig. 3 is a side view, partly in section, along the line 3—3, Fig. 2.

Fig. 4 is a top plan view of a part of the structure showing a modification.

Fig. 5 is an exploded perspective view of a lampholder embodying the invention.

Fig. 6 is a top plan view with the housing partly broken away to show inside structure.

Fig. 7 is a side view partly in section on the line 7—7, Fig. 6.

Fig. 8 is a detail perspective view illustrating the manner in which a wire end may be released from a locking tongue.

Fig. 9 is an exploded perspective view of an electric switch embodying the invention.

Fig. 10 is a top plan view of the base of the housing of Figure 9 with the switch parts located therein.

Fig. 11 is a side view partly in section along the line 11—11, Fig. 10.

Referring to Figs. 1 to 3, the duplex plug receptacle comprises a base 15 and a cover 16 which are made of suitable insulating material and which together form the receptacle housing.

Base 15 has side walls 17, end walls 18, a bottom wall 19, and a longitudinally extending central partition wall 20 which at its two ends is in the form of spear-shaped heads 21. At points spaced inwardly from heads 21, wall 20 is provided with four wings 22 which with the opposed surfaces of heads 21 and the adjacent surfaces of side walls 17 form four contact cavities 23, two on each side of the base. Adjacent each contact cavity 23, the side surfaces of heads 21 in conjunction with the side surfaces of corner blocks 24 define cavities 25 which may be termed the lower portions of terminal cavities. Cavities 25 at their inner ends communicate with contact cavities 23 and at their outer ends communicate with wiring openings 26 in end walls 18. Corner blocks 24 are integral with the side, end, and bottom walls of the base and are of a thickness somewhat less than the height of the side and end walls to provide ledges 27. The surfaces of partition wall 20 and heads 21 also are of less thickness than the height of the side and end walls and their top surfaces are flush with ledges 27. As shown best in Fig. 2, cavities 25 extend angularly with respect to each other and at their outer ends connect with wiring chambers 28 defined by opposed surfaces 29 of corner blocks 24. Terminal cavity portions 25 connect with wiring chambers 28 through wire end-receiving openings 30 defined by adjacent walls of heads 21 and corner blocks 24. Openings 30 are of a width to receive the largest diameter wire with which the receptacle is to be used. The outer ends of spear-shaped heads 21 project into chambers 28 somewhat and serve as dividing walls to separate a pair of wires as pointed out hereinafter.

Cover 16, adjacent to its ends, is provided with transverse partition walls 35 having cavities 36 which form the upper portions of the terminal cavities. Cavities 36 are in line with cavities 25. At each corner of the receptacle, cavities 25 and 36 cooperate to form terminal cavities which extend in depth from the inner surface of the top wall of cover 16 to the inner surface of the bottom wall of base 15 as best shown in Fig. 3. There is thus provided at each corner of the housing a contact cavity 23, outwardly of which is a terminal cavity 25, the outer end of the terminal cavity communicating with a wiring chamber 28 through a wire end-receiving opening 30.

Wiring chambers 28 are of a size to receive the end of the various sizes of non-metallic sheathed cable with which the receptacle is intended to be used; the passages leading up to openings 30, which passages are tapered as best shown in Fig. 2, are of a size to receive a cable wire with its individual insulation thereon and, as stated above, openings 30 are of a size to receive the largest bare wire with which the receptacle is intended to be used.

In each contact cavity is a contact structure 37 comprising spaced spring fingers adapted to make contact with the contact blades of an attachment plug cap of usual construction, the top wall of cover 16 being provided with pairs of slots 38 through which contact blades of a plug cap may be inserted. The two contact structures 37 on each side of the base are connected together by a strap 39 which is integral with structures 37 and extends from one to the other along the inside surface of a side wall 17, it being tight against and bowed inwardly somewhat by a projection 40 on the side wall, thus wedging the contact structures 37 firmly against walls of cavities 23 to hold them in place in the cavities.

Integral with each contact structure is a terminal bar 41 which rests against the bottom wall of a terminal cavity as best shown in Fig. 3, it having a flange 42 which engages in a groove 43 in the bottom wall of the cavity and an angularly extending arm 44 which connects it to the contact structure. Also, it is provided with a side flange 45. Terminal bar 41 is set down in a depression in the bottom wall of the cavity so that its top surface is flush with such wall and with the bottom wall of opening 30.

In each terminal cavity is means including a spring locking tongue 46 for use in connecting a bare conductor or wire end to the terminal bar therein, the arrangement being similar to that disclosed and claimed in my aforementioned application. The locking tongue extends across the cavity wall in which opening 30 is formed. At its one or upper end it is anchored against the top wall of the terminal cavity which forms a rigid backing for it. The other or free end of the locking tongue projects somewhat over the upper edge of opening 30. The locking tongue is formed integral with and is carried by an anchoring strip 47 the side edges of which are held in opposed grooves 48 in the side walls of cavity portion 25. The anchoring strip is connected to the locking tongue by an arm 49, the connection between the arm and the locking tongue being in the form of a rounded elbow 50. The locking tongue structure is thus held firmly in position between the bottom wall of the base and the top wall of the cover. Arm 49 is of less width than the anchoring strip to provide shoulders 51 flush with ledge 27 and the surface of head 21. Preferably the free end of the locking tongue is angularly bent to provide an angularly extending tip 52 which slopes inwardly as regards the housing. Also, the anchoring strip is provided with a notch 53 through which a bare conductor end may extend.

Viewed from another aspect, the locking tongue structure comprises a generally U-shaped member formed from spring material, one arm of the member at its outer end projecting somewhat over a wire-receiving opening 30 and the other arm at its outer end being fastened to a cavity wall and serving to hold the bottom of the U anchored firmly against a wall of the cavity.

Fig. 3 shows a bare wire end 55 locked against a terminal bar 41 by a locking tongue 46. Means are provided at each end of the receptacle for moving a locking tongue, as indicated in dotted lines in Fig. 3, to release a wire end held by it so the wire end may be pulled out from under the tongue. In Figs. 1 to 3 the releasing means at each end is shown as comprising a rectangular plate 56 held between ledges 27 and the top surface of head 21 on the one side and the surface of partition wall 35 on the other side. One end of plate 56 projects out through an end slot formed by notches 57 in end walls of the base and cover; the other end is adjacent to the two locking tongues at the end of the receptacle, the plate being wide enough to span both locking tongues. The plate is provided with side wings 58 which serve to prevent its falling out through the end slot. As will be clear from an inspection of Figs. 2 and 3, when the plate is moved inward it will engage the two adjacent locking tongues moving each from the full line position shown in Fig. 3 to the dotted line position thus releasing wire ends held by the locking tongues.

When the duplex receptacle is assembled, the base and cover, after the metal parts have been positioned between them, are permanently fastened together by suitable means such as drive screws 59, one of which is shown in Fig. 3, located at the four corners of the housing, the drive screws extending through countersunk holes 59a in the base and threading into holes 59b in the cover. Also, in the base and cover are aligned holes 59c and 59d respectively for the reception of wood screws 59e for fastening the receptacle against a wall, the hole 59d in the cover being countersunk to receive the head of the screw.

Surface wiring devices are used ordinarily with non-metallic sheathed cable and wiring devices embodying my invention are intended primarily for use with such cable. In Figs. 2 and 3 an end of a length of non-metallic sheathed cable of usual construction is shown connected to the receptacle; 55 indicating the two wires or conductors of the cable; 60 indicating the insulation on the individual wires; and 61 indicating the overall insulation. To connect a cable end to the receptacle, the overall insulation 61 and the insulation 60 on the individual wires is removed to the extent indicated in Figs. 2 and 3. For this purpose a suitable gage, for example one marked on the back of the receptacle, may be used for measuring the lengths of insulation to be removed. After the insulation has been removed, all that is necessary in order to connect the cable end to the receptacle is to insert the end into the receptacle through opening 26. The pointed end of head 21 serves to guide the two wire ends through wire-receiving openings 30 into the terminal cavities. The ends of the wires engage the locking tongues pushing them inward until the wire ends pass under them whereupon the locking tongues engage the outer surfaces of the wire ends forcing them firmly into engagement with the terminal bars 41 and locking them in place. The pointed end of head 21 serves as a stop which is engaged by the end of insulation 61 at the base of the V between the two wires to limit movement of the cable end into the receptacle end. The insulation 60 on the wire ends extends into the tapered passages leading to openings 30. To remove a cable end from a receptacle all that is necessary is to push inward on plate 56 (using a suitable blunt-ended tool, for example) to move the locking tongues from engagement with the wire ends and pull the cable end out.

The purpose of the notch 53 in the anchoring strip 47 is to permit of a wire end being pushed in beyond the anchoring strip so that a sufficient length of wire end may be pushed under the locking tongue to insure a good connection and at the same time permit the anchoring strip 47 to be directly adjacent to the free end of the locking tongue, a thing which serves to minimize the overall length of the receptacle.

In Fig. 4 is shown a modified form of cable releasing means wherein the cable-releasing plate 62, corresponding to plate 56 of Figs. 1 to 3, instead of being mounted for sliding movement, is pivotally mounted as indicated at 63, it releasing the locking tongues by being turned on its pivot as indicated in dotted lines in Fig. 4. Otherwise the structure illustrated in Fig. 4 is similar to that of Figs. 1 to 3.

In Figs. 5 to 8, my invention is shown as being embodied in a lampholder in which the screw shell and the center contact for the lamp are mounted in a contact cavity located centrally of the lampholder housing and are connected with terminal bars positioned in terminal cavities at the ends of the housing, there being in each terminal cavity a locking tongue structure similar to that shown in Figs. 1 to 3.

The housing comprises a base 70 and a cover 71 which are made from suitable insulating material and which together form the receptacle housing. Base 70 has side walls 72, end walls 73, a bottom wall 74, and a longitudinally extending partition wall 75 which at its two ends is in the form of spear-shaped heads 76. At its four inside corners the base is provided with corner blocks 77, the inner portions of the side surfaces of which form, with the adjacent opposed surfaces of head 76, cavities 78; two at each end of the housing. Cavities 78 form the lower ends of the terminal cavities. The space in the center of the housing between the inside surfaces of corner blocks 77 forms a contact cavity 79. The housing end walls 73 are provided with openings 80 which communicate with wiring chambers 81 defined by opposed surfaces of the outer portions of corner blocks 77. The outer ends of heads 76 project into chambers 81 and define with the adjacent side walls of the corner blocks wire-receiving openings 82 which connect the wiring chamber with the cavities 78, openings 82 being of a width to receive the largest diameter wire with which the lampholder is to be used.

The central portion of partition wall 75 is shaped to provide a pad 85 having at one side a projecting wing 86. Positioned over pad 85 is a lampholder center contact 87 provided with arms 88 which fit down along opposite sides of wing 86; and in the two cavities 78 on the one side of the housing are terminal bars 89 connected to arms 88 by straps 90. Terminal bars 89 are preferably U-shaped in cross section and fit down into recesses in the cavities so their inner surfaces are flush with the cavity walls.

Positioned around pad 85 is the screw shell 91 of the lampholder, its bottom wall 92 being shaped to fit around three sides of pad 85 as shown in Fig. 6; and in the two cavities 78 on the other side of the housing are terminal bars 93 (similar to terminal bars 89) which are connected to bottom wall 92 by a strap 94, the connection being made by a rivet as indicated at 95. Terminal bars 93 also are set in flush with the surface of the cavity walls as shown in Fig. 7 and they are offset with respect to strap 94 to provide shoulders 96 which fit against walls of the cavities.

Cover 71 adjacent to its ends is provided with walls which define four end cavities 97 which are in alignment with cavities 78 and, with such cavities, form four terminal cavities which extend from the inner surface of base bottom wall 74 to the inner surface of the top wall of cover 71. Cover 71 is provided with posts 98 which fit against straps 90 and 94 to assist in holding the straps, the screw shell, the center contact, and the contact bars firmly against the bottom wall of the base; also the cover has walls which form keys 99 which fit along opposed sides of shell 91 and engage notches 100 in the shell to assist in holding it in place. The cover has an opening in alignment with shell 91 and surrounding the opening is a projecting sleeve 101 which surrounds the outer end of the shell. At the ends of the cover are lugs 102 which fit into the upper ends of openings 80.

In each terminal cavity is a locking tongue structure similar to that shown in Figs. 1 to 3 and functioning in the same manner, each structure comprising a locking tongue 103, an anchoring strip 104 held in side grooves 105 (the anchoring strip in this instance being provided with transverse corregations to increase its effective thickness, thus enabling wider and hence more readily moldable grooves to be used) and a connecting arm 106, the anchoring strip 104 being provided with a notch 107 corresponding to the notch 53 of the Figs. 1 to 3 structure. The locking tongue structures are arranged in the terminal cavities in the same manner as are those of Figs. 1 to 3 and function in the same manner.

In Figs. 5 to 8 a modified form of locking tongue-releasing means is shown. Each comprises a plate 110 positioned in a pocket formed by depressions 112 and 113 in the base and cover respectively. The pocket extends throughout the length of the adjacent wiring chamber 81 and cavities 78 and 97. The plate is positioned in the pocket between locking tongues 103 and the outer end wall of the pocket which end wall is formed by lug 102 and the adjacent edge portions of end wall 73. When the plate is moved inwardly, it engages the locking tongues to move them from engagement with wire ends being held by them as described in connection with the operation of plates 56 of Figs. 1 to 3. For moving plate 110 to effect releasing movement of the locking tongues, the plate is provided with a notch 114 and cover 71 is provided with an opening 115 in line with such notch (see Fig. 7). With this arrangement a plate may be moved to disengage the locking tongues by inserting a pointed instrument such as a screwdriver through opening 115 into engagement with the bottom of notch 114 and prying the plate inwardly. The one wall of opening 115 may be tapered as shown in Fig. 7 to permit sufficient movement of the end of a tool. This operation is depicted in Fig. 8 where 116 indicates the end of a screwdriver inserted through opening 115 into engagement with the plate. By reference to the lower end of Fig. 6, it will be seen that the outer end of head 76 extends across opening 115 and stands directly beneath notch 114 whereby the end of the head serves as a stop for a tool end inserted through opening 115, thus preventing a tool end being pushed down into engagement with a live wire end.

In Figs. 5 to 8 the base and cover are permanently fastened together by drive screws, one of which is shown in Fig. 7 at 117 (the arrangement being similar to that of Figs. 1 to 4), and holes 118 are provided for wood screws 119 for fastening the lampholder against a surface.

In both the duplex receptacle construction and the lampholder construction, the incoming "hot" or live conductor is connected to the contact and terminal structures on one side of the housing, and the incoming "ground" or neutral conductor is connected to the contact and terminal structures on the other side of the housing. With this arrangement the terminal contacts at the end of the housing opposite to that at which the incoming conductors are connected may be used for the connection of a pair of conductors leading to another wiring device such as another duplex receptacle or another lampholder. As a result, a number of the wiring devices such as the duplex receptacles and the lampholders may be connected in parallel in a single circuit by merely connecting ends of the wiring devices together by lengths of non-metallic sheathed wire.

In Figs. 9 to 11 my invention is shown as being embodied in a switch in which the switch contacts are mounted in a contact cavity located centrally of the switch housing and are connected with terminal bars positioned in terminal cavities at the ends of the housing, there being in each terminal cavity a locking tongue structure similar to that shown in Figs. 1 to 3 and in Figs. 5 to 8.

The housing, comprising the base and the cover, insofar as the terminal cavities, the wiring chambers, the locking tongue structure and the locking tongue-releasing means is concerned, is similar to that shown in Figs. 5 to 8 and similar reference numerals with the exponent *a* added have been used to designate corresponding parts. The contact cavity has been modified to accommodate the switch mechanism. There is a lacuna 120 at the central portion of partition wall 75*a* on opposite sides of which are posts 121 having rounded sockets 122 in which trunnions 123 on switch handle 124 are pivoted, being held therein by complementary sockets 125 formed by walls on cover 71*a*. At the bottoms of sockets 122 are grooves 126 in which arms 127 of a U-shaped frame, which forms a part of the movable contact element of the switch, are pivoted by means of short lugs 128. Also carried by the frame are the two contact blades 129. The movable contact element is held by an overcenter spring 130 positioned between the bottom strap of the U-shaped frame and the inner end of handle 124, the bottom strap and the handle have projections 131 and 132, respectively, positioned within the coils of the spring at its two ends to hold the spring in position. On projection 132 are side wings 133 which engage arms 127 to effect starting movement of the contact element in case the overcenter spring, due to sticking of the contacts, fails to do so. This is a well-known type of overcenter tumbler switch movement, the operation of which is well understood and requires no explanation.

In contact cavity 79*a* on the one side of the switch housing are stationary contacts 135 with which contact blades 129 cooperate in opening and closing the switch. They are connected with terminal bars 136 in adjacent cavities 78*a* by short straps 137 which are shaped to fit against suitable shoulders formed by walls in the base and are held in place by walls formed in the cover.

In the cavities 78*a* on the other side of the base are terminal bars 138 connected by a strap 139 which is shaped to fit against suitable shoulders in the base (see Fig. 11), and is held against them by the cover.

Otherwise, as stated, the structure is similar to that of Figs. 5 to 8 and functions in the same manner insofar as connecting and disconnecting cable wire ends is concerned.

Referring particularly to Fig. 10, it will be noted that the switch opens the circuit on one side only, i. e., at contacts 135; and in connecting the switch in circuit the "hot" or live conductor is connected to this side of the switch. The neutral conductor is connected to terminals 138 which are connected together by strap 139. Accordingly, terminals 138 and strap 139 serve as a splicing means or connection for the neutral wire ends of the non-metallic sheathed cable at the two ends of the switch. Usually the switch is located between the power source and the load. In some instances, however, the wiring system in which the switch is used may be such that the switch is at the end of a circuit, i. e., the load is between the power source and the switch. As a result, a cable is connected at only one end of the switch. This may occur where the switch is used not in connection with surface duplex receptacles or lampholders of the type illustrated, but in connection with some other type of load, for example, a fixture wired through a usual form of metal outlet box where the neutral conductor is carried around the fixture and the line conductor is carried through the fixture to the switch. To take care of this situation, there is provided a short circuiting connector comprising a U-shaped conductor 144 carried by a handle or plug 145 of suitable insulating material which fits the switch end and serves to connect the contact terminals at an end of the switch directly to each other. As illustrated in Fig. 10, the wire ends 144 of the short circuiting plug 145 are pushed into the device where they make connection with terminals 136 and 138, being held in place by the locking tongues just as in the case of wires. Similarly, the short circuiting plug can be removed by actuating plate 110*a*.

By my invention wherein the locking tongue structures are held in terminal cavities formed partly in the base and partly in the cover, the structures extending vertically with respect to the base and being held between the inner surface of the bottom wall of the base and the inner surface of the top wall of the cover, I provide compact devices of minimum length; also devices wherein non-metallic sheathed cable connected to them enters them close to the surface on which they are mounted thus reducing to a minimum the bend required in the cable at such points.

The invention provides constructions which are easily wired and wherein when wired there are no exposed live metal parts since the insulated ends of the cables are positioned well within the confines of the housings.

Also of importance are the spear or triangular shaped heads which serve to divide and separate by substantial distances the bare wire ends and provide means wherein when a locking tongue-releasing means as shown in connection with the lampholder and switch is used (this being the now preferred arrangement), there is no danger of a releasing tool being brought into engagement with live metal parts. The locking tongue-releasing means shown in connection with the lampholder and the switch has advantages over that shown in connection with the duplex receptacle in that it is entirely concealed within the housing and is handier to operate since the tool opening is at the top surface of the housing.

What I claim as new and desire to secure by Letters Patent in the United States is:

1. In a surface wiring device, a housing comprising a base and a cover, walls in the base and cover which cooperate to define at one or both ends of the housing two adjacent terminal cavities which extend vertically with respect to the bottom wall of the base from the inner surface of such bottom wall to the inner surface of the top wall of the cover, outer end walls of said cavities being provided with wire end-receiving openings adjacent to the bottom walls of the cavities, terminals on the bottom walls of the cavities in line with said openings, spring locking tongues in said cavities each having one end anchored in the base while the mid-section is formed with a rounded elbow which bears against the underside of the cover, the free end of each locking tongue projecting over an edge of the related wire end-receiving opening, the said cover serving to hold the locking tongues firmly in place.

2. In a surface wiring device, a housing comprising a base and a cover, walls in the base and cover which cooperate to define at one or both ends of the housing two adjacent terminal cavities which extend vertically with respect to the bottom wall of the base from the inner surface of such bottom wall to the inner surface of the top wall of the cover, outer end walls of said cavities being provided with wire end-receiving openings adjacent to the bottom walls of the cavities, terminals on the bottom walls of the cavities in line with said openings, and locking tongue structures in the cavities comprising U-shaped spring members, one arm of the U being clamped between the bottom and top walls of the cavity and the other arm of the U extending from the top wall of the cavity to a position where its lower end projects partly over the wire end-receiving opening to form a locking tongue to clamp a wire end against a terminal.

3. The combination defined by claim 2 wherein the arm of the U which is clamped between the base and cover is provided with a notch through which a wire end may extend to a point inwardly of such arm.

4. The combination defined by claim 2 wherein there is provided between the base and cover adjacent to the locking tongues plate means adapted to be moved against the tongues to move the tongues from locking engagement with wire ends held by them.

5. In an electric switch for surface wiring, a housing comprising a base and a cover, walls in the base and cover which cooperate to define in the housing a pair of terminal cavities adjacent to each end of the housing, walls which define at the end of the housing bare wire-receiving openings which communicate with said terminal cavities, terminals in the terminal cavities, locking means in the terminal cavities adapted to engage a bare wire end inserted through a receiving opening to hold the wire end in engagement with a terminal, a switch in the housing having contacts connected to the two terminals on one side of the housing, and a strap in the housing which connects the two terminals on the other side of the housing, whereby the switch may be used to open and close the live wire of a circuit and the strap used to carry the neutral wire to the switch, and a plug of insulating material having a short circuiting wire thereon engaging the two terminals at one end of the housing to short circuit such terminals.

6. In an electric switch for surface wiring, a housing comprising a base and a cover, walls on the base and cover which cooperate to define in the housing a pair of terminal cavities adjacent to each end of the housing and a wiring chamber at each end of the housing which communicates with adjacent terminal cavities through wire end-receiving openings, said wiring chambers being adapted to receive the ends of non-metallic sheathed cable with which the wiring device is intended to be used and said wire-receiving openings being adapted to receive a bare wire end of such cable, terminals in the terminal cavities, spring locking tongues in the terminal cavities adapted to engage bare wire ends inserted through such receiving openings to hold such wire ends in engagement with the terminals, a switch in the housing having contacts connected to the two terminals on one side of the housing, a strap in the housing which connects the two terminals on the other side of the housing, a plug adapted to fit in a wiring chamber, and a short circuiting wire carried by said plug, the ends of which wire are adapted to pass through adjacent wire-receiving openings into contact with terminals in the adjacent terminal cavities.

7. In a surface wiring device, a housing comprising a base and a cover, walls on the base and cover which cooperate to define in the housing at each of its ends terminal cavities which extend vertically with respect to the base from the inner surface of the bottom wall of the base to the inner surface of the top wall of the cover and a wiring chamber outwardly of said cavities, the walls on the base between adjacent cavities comprising spear-shaped heads with their pointed ends projecting into the wiring chambers, said heads defining with adjacent walls bare wire end-receiving openings connecting the wiring chambers with the terminal cavities adjacent to their bottom walls, terminals on the bottom walls of said cavities in line with said openings, spring locking tongues in said cavities with their lower ends projecting over edges of said openings, means anchoring the other ends of said locking tongues against the inner surface of the cover top wall, plates positioned in the housing adjacent to said locking tongues between said spear-shaped heads and walls on the cover adapted to be moved against said locking tongues to move the tongues from locking engagement with wire ends held by them, and walls defining openings in the top wall of the cover in line with said spear-shaped heads through which a tool end may be inserted to engage a plate for moving such plate to effect unlocking movement of the tongues, said spear-shaped heads serving as barriers to prevent a tool end inserted through a cover opening from being brought into engagement with a wire end in the housing.

8. In a surface wiring device, a housing comprising a base and a cover, walls on the base and cover which cooperate to define in the housing at each of its ends terminal cavities which extend vertically with respect to the base from the inner surface of the bottom wall of the base to the inner surface of the top wall of the cover and a wiring chamber outwardly of said cavities, the walls on the base between adjacent cavities comprising spear-shaped heads with their pointed ends projecting into the wiring chambers, said heads defining with adjacent walls bare wire end-receiving openings connecting the wiring chambers with the terminal cavities adjacent to their bottom walls, terminals on the bottom walls of said cavities in line with said openings, U-shaped spring locking members in said cavities, one arm of the U being clamped between the bottom and top walls of the cavity and the other arm of the U extending from the top wall of the cavity to a position where its lower end projects partly over the wire end-receiving opening to form a locking tongue to clamp a wire end against a terminal, plates positioned in the housing adjacent to said locking tongues between said spear-shaped heads and walls on the cover adapted to be moved against said locking tongues to move the tongues from locking engagement with wire ends held by them, and walls defining openings in the top wall of the cover in line with said spear-shaped heads through which a tool end may be inserted to engage a plate for moving such plate to effect unlocking movement of the tongues, said spear-shaped heads serving as barriers to prevent a tool end inserted through such cover openings from being brought into engagement with a wire end in the housing.

9. In a surface wiring device, a housing comprising a base and a cover, walls on the base and cover which cooperate to define in the housing a terminal cavity adjacent to each of the four corners of the housing, a contact cavity inwardly of the terminal cavities and a wiring chamber at each end of the housing which communicates with adjacent terminal cavities through wire end-receiving openings, said wiring chambers being adapted to receive the ends of non-metallic sheathed cable with which the wiring device is intended to be used and said wire-receiving openings being adapted to receive a bare wire end of such cable, terminals in the terminal cavities, spring locking tongues in the terminal cavities adapted to engage bare wire ends inserted through said receiving openings to hold such ends in engagement with the terminals, and contact members in the housing one connected to the terminals on one side of the housing and the other connected to the terminals on the other side of the housing whereby circuit wires of a cable connected to the terminals at one end of the housing will be connected to circuit wires of a cable connected to the terminals at the other end of the housing.

10. In a surface wiring device having a housing comprising a base and a cover, walls in the housing which define a terminal cavity extending vertically between the bottom wall of the base and the top wall of the cover, and a pair of spring locking tongues which extend vertically across the cavities for clamping the wire ends of a two-conductor cable, means for moving the spring locking tongues simultaneously to release the wire ends held by them comprising a plate mounted between the base and cover and movable from outside the housing into engagement with the locking tongues.

11. The combination defined by claim 10 wherein the cover is provided with an opening in line with said plate through which a tool end may be inserted into engagement with the plate for moving such plate.

12. In a surface wiring device, a housing comprising a base and a cover, walls on the base and cover which cooperate to define in the housing a pair of terminal cavities adjacent to each end of the housing, a contact cavity inwardly of the terminal cavities and a wiring chamber at each end of the housing which communicates with adjacent terminal cavities through wire end-receiving openings, said wiring chambers being adapted to receive a non-metallic sheathed cable with which the wiring device is intended to be used, the said wire end-receiving openings being adapted to receive the bare wire ends of such cable, terminals in the terminal cavities, and spring locking tongues in the terminal cavities adapted to engage the bare wire ends inserted through said receiving openings to hold such ends in engagement with the terminals, and movable plates located in the said housing to act against an adjacent pair of locking tongues so that the cable may be withdrawn from the housing.

13. In a surface wiring device, a housing comprising a base and a cover, walls on the base and cover which cooperate to define in the housing a pair of terminal cavities adjacent to each end of the housing, a contact cavity inwardly of the terminal cavities and a wiring chamber at each end of the housing which communicates with adjacent terminal cavities through wire end-receiving openings, said wiring chambers being adapted to receive a sheathed cable which is to be electrically connected to the device, terminals in the terminal cavities and spring locking tongues in the terminal cavities adapted to engage the bare wire ends of said cables inserted through said receiving openings to hold such ends in engagement with the terminals, and plates provided in the housing adjacent to the locking tongues which are adapted to be moved against the tongues to withdraw the tongues from locking engagement with the wire ends held thereby, said cover being provided with openings through which a tool end may be inserted into engagement with the plates in order to move them against the locking tongues.

14. In a surface wiring device, a housing comprising a base and cover, walls on the base and cover which cooperate to define in the housing a pair of terminal cavities adjacent to each end of the housing, a contact cavity inwardly of the terminal cavities and a wiring chamber at each end of the housing which communicates with adjacent terminal cavities through wire end-receiving openings, said wiring chambers being adapted to receive the ends of sheathed cable with which the wiring device is intended to be used, terminals in the terminal cavities, and spring locking tongues in the terminal cavities adapted to engage the bare wire ends of said cables inserted through said receiving openings to hold such ends in engagement with the terminals, a longitudinally extending dividing wall in the said base for separating the said contact cavity, the ends of said wall being enlarged into outwardly extending spear-shaped heads located between the said terminal cavities whereby the terminal cavities diverge inwardly of the housing to effect a widened separation of the wire ends positioned in the terminal cavities.

References Cited in the file of this patent

UNITED STATES PATENTS

| | | |
|---|---|---|
| 1,564,761 | Daiker | Dec. 8, 1925 |
| 1,678,745 | Schellenger | July 31, 1928 |
| 1,683,370 | Pacent | Sept. 4, 1928 |
| 1,950,826 | Smart | Mar. 13, 1934 |
| 1,960,191 | Staub et al. | May 22, 1934 |
| 2,362,794 | Benander | Nov. 14, 1944 |
| 2,617,844 | Sanda | Nov. 11, 1952 |

FOREIGN PATENTS

| | | |
|---|---|---|
| 466,821 | Great Britain | June 7, 1937 |